United States Patent
Ideta et al.

(10) Patent No.: US 10,992,009 B2
(45) Date of Patent: Apr. 27, 2021

(54) NONAQUEOUS ELECTROLYTE BATTERY SEPARATOR AND NONAQUEOUS ELECTROLYTE BATTERY

(71) Applicant: Toray Industries, Inc., Tokyo (JP)

(72) Inventors: Kohei Ideta, Okazaki (JP); Mitsuru Sugihara, Otsu (JP); Natsuko Chayama, Otsu (JP); Takanobu Omori, Otsu (JP)

(73) Assignee: Toray Industries, Inc.

(*) Notice: Subject to any disclaimer, the term of this patent is extended or adjusted under 35 U.S.C. 154(b) by 49 days.

(21) Appl. No.: 16/338,035

(22) PCT Filed: Oct. 23, 2017

(86) PCT No.: PCT/JP2017/038161
§ 371 (c)(1),
(2) Date: Mar. 29, 2019

(87) PCT Pub. No.: WO2018/079474
PCT Pub. Date: May 3, 2018

(65) Prior Publication Data
US 2020/0028138 A1    Jan. 23, 2020

(30) Foreign Application Priority Data

Oct. 28, 2016   (JP) ............................. JP2016-211471

(51) Int. Cl.
| | |
|---|---|
| H01M 2/16 | (2006.01) |
| H01M 50/411 | (2021.01) |
| C08K 3/013 | (2018.01) |
| C08L 23/02 | (2006.01) |
| C08L 77/00 | (2006.01) |
| C08L 79/08 | (2006.01) |
| H01M 10/0525 | (2010.01) |

(52) U.S. Cl.
CPC ............ *H01M 50/411* (2021.01); *C08K 3/013* (2018.01); *C08L 23/02* (2013.01); *C08L 77/00* (2013.01); *C08L 79/08* (2013.01); *H01M 10/0525* (2013.01)

(58) Field of Classification Search
CPC ......... C08K 3/013; C08L 23/02; C08L 77/00; C08L 79/08; H01M 10/0525; H01M 2/1653; H01M 2/166; H01M 2/1686
See application file for complete search history.

(56) References Cited

U.S. PATENT DOCUMENTS

| | | | | |
|---|---|---|---|---|
| 2010/0151333 A1* | 6/2010 | Nakamori | ............ | H01M 2/162 429/249 |
| 2010/0233547 A1 | 9/2010 | Baba et al. | | |
| 2013/0115519 A1* | 5/2013 | Lee | ...................... | H01M 2/1653 429/252 |
| 2013/0302661 A1* | 11/2013 | Kim | ...................... | H01M 2/166 429/144 |
| 2014/0356711 A1* | 12/2014 | Kasahara | ............... | H01M 4/134 429/217 |
| 2015/0207123 A1* | 7/2015 | Jeon | .................. | C08G 73/1039 429/144 |
| 2015/0280197 A1* | 10/2015 | Zhao | ................... | H01M 2/1686 429/144 |
| 2016/0013465 A1 | 1/2016 | Akiike | | |
| 2017/0342214 A1 | 11/2017 | Chayama et al. | | |

FOREIGN PATENT DOCUMENTS

| | | |
|---|---|---|
| CN | 104183806 A | 12/2014 |
| JP | 2000030686 A | 1/2000 |
| JP | 2008123996 A | 5/2008 |
| JP | 2009224343 A | 10/2009 |
| JP | 2011137063 A | 7/2011 |
| JP | 2015028840 A | 2/2015 |
| JP | 2015204133 A | 11/2015 |
| JP | 2016025093 A | 2/2016 |
| WO | 2014148577 A1 | 9/2014 |
| WO | 2016056480 A1 | 4/2016 |

OTHER PUBLICATIONS

Extended European Search Report for European Application No. 17 864 241.9 dated Feb. 6, 2020, 8 pages.
International Search Report and Written Opinion for International Application No. PCT/JP2017/038161 dated Nov. 2, 2017, 7 pages.

* cited by examiner

*Primary Examiner* — Victoria H Lynch
(74) *Attorney, Agent, or Firm* — RatnerPrestia

(57) ABSTRACT

Provided is a nonaqueous electrolyte battery separator including a porous film (I) containing a polyolefin resin; and a porous layer (II) containing an inorganic filler, a water-soluble polymer having a structure represented by the following general formula (1), a water-insoluble polymer and a basic compound. The nonaqueous electrolyte battery separator is excellent in shape stability under a high temperature condition of 160 to 200° C.

[Chemical Formula 1]

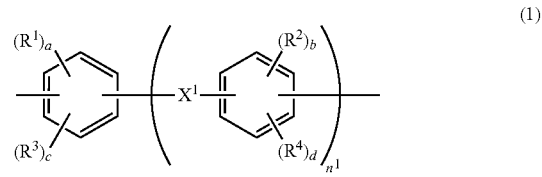

(1)

9 Claims, No Drawings

NONAQUEOUS ELECTROLYTE BATTERY SEPARATOR AND NONAQUEOUS ELECTROLYTE BATTERY

CROSS REFERENCE TO RELATED APPLICATIONS

This is the U.S. National Phase application of PCT/JP2017/038161, filed Oct. 23, 2017, which claims priority to Japanese Patent Application No. 2016-211471, filed Oct. 28, 2016, the disclosures of these applications being incorporated herein by reference in their entireties for all purposes.

FIELD OF THE INVENTION

The present invention relates to a nonaqueous electrolyte battery separator, and a nonaqueous electrolyte battery using the nonaqueous electrolyte battery separator.

BACKGROUND OF THE INVENTION

In recent years, nonaqueous electrolyte batteries such as lithium ion secondary batteries have been widely used as power sources for portable electronic devices and transportation equipment, and in particular, the demand for the nonaqueous electrolyte batteries is expected to grow as high-output power sources for driving vehicles because they are lightweight, and a high energy density can be obtained.

In a nonaqueous electrolyte battery, a positive electrode and a negative electrode are disposed in a cell so as to be opposed to each other, and an ion-permeable separator is provided between both the electrodes for preventing a short circuit between these electrodes. As a separator, a polyolefin porous film is suitably used. The polyolefin porous film is excellent in electrical insulation property, ion permeability, electrolyte solution resistance and oxidation resistance. Further, at a temperature of about 100 to 150° C. which is associated with abnormal temperature elevation, the polyolefin porous film blocks a current by closing pores, so that excessive temperature elevation can be suppressed. However, if temperature elevation is continued for some reason even after the pores are closed, the polyolefin porous film is shrunk, so that a short circuit may occur between the electrodes, resulting in firing of the nonaqueous electrolyte battery.

As separators capable of forming a nonaqueous electrolyte battery excellent in safety, there have been heretofore proposed a nonaqueous electrolyte battery separator including a resin porous film containing a thermoplastic resin as a main component and having a thermal shrinkage ratio of 10% or more at 150° C., and a heat-resistant porous layer containing heat-resistant fine particles (see, for example, Patent Document 1); a nonaqueous electrolyte solution secondary battery separator obtained by laminating a water-soluble polymer porous film and a polyolefin porous film (see, for example, Patent Document 2); a lithium ion battery separator including a polymer microporous film and a coating layer formed of a slurry composition containing inorganic fine particles, a water-soluble polymer, water-insoluble organic fine particles and water (see, for example, Patent Document 3); a lithium ion battery separator including a layer containing a heat-resistant nitrogen-containing aromatic polymer and ceramic powder (see, for example, Patent Document 4); and the like.

PATENT DOCUMENTS

Patent document 1: Japanese Patent Laid-open Publication No. 2008-123996
Patent document 2: Japanese Patent Laid-open Publication No. 2009-224343
Patent document 3: Japanese Patent Laid-open Publication No. 2016-25093
Patent Document 4: Japanese Patent Laid-open Publication No. 2000-30686

SUMMARY OF THE INVENTION

The techniques described in Patent Documents 1 to 4 are excellent in shape stability at a temperature of about 100 to 150° C., but do not have sufficient shape stability under a high temperature condition of 160 to 200° C. which may occur in uses of high-output power sources which have been required in recent years. Thus, an object of the present invention is to provide a nonaqueous electrolyte battery separator excellent in shape stability in a temperature range of 160 to 200° C.

For achieving the above-described object, the present invention mainly has the following constitution.

The present invention provides a nonaqueous electrolyte battery separator including a porous film (I) containing a polyolefin resin; and a porous layer (II) containing an inorganic filler, a water-soluble polymer having a structure represented by the following general formula (1), a water-insoluble polymer and a basic compound.

[Chemical Formula 1]

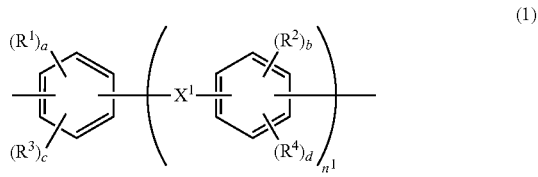

In the above general formula (1), $R^1$ and $R^2$ each independently represent a hydroxyl group, a carboxyl group or a sulfonic acid group; $R^3$ and $R^4$ each independently represent a halogen, a nitro group or a monovalent organic group having 1 to 10 carbon atoms; a and b each independently represent an integer of 1 or more, and c and d each independently represent an integer of 0 or more; provided that a+c and b+d each independently represent an integer of 1 to 4; $n^1$ represents an integer of 0 to 3; and $X^1$ represents a single bond, $CH_2$, $SO_2$, $CO$, $O$, $S$, $C(CH_3)_2$ or $C(CF_3)_2$.

In addition, the present invention provides a nonaqueous electrolyte battery in which a positive electrode and a negative electrode are laminated with a separator interposed therebetween, the separator being the nonaqueous electrolyte battery separator described above.

The battery separator of the present invention is excellent in shape stability in a temperature range of 160 to 200° C.

DETAILED DESCRIPTION OF EMBODIMENTS OF THE INVENTION

As described above, a nonaqueous electrolyte battery separator of the present invention includes a porous film (I) containing a polyolefin resin; and a porous layer (II) containing an inorganic filler, a water-soluble polymer having a structure represented by the general formula (1), a water-insoluble polymer and a basic compound. Preferably, the nonaqueous electrolyte battery separator has the porous layer (II) on one side or both sides of the porous film (I).

Here, the phrase "having the porous layer (II) on one side of the porous film (I)" means that the porous layer (II) is formed on one surface of the porous film (I). In addition, the phrase "having the porous layer (II) on both sides of the porous film (I)" means that the porous layer (II) is formed on each of both surfaces of the porous film (I). The present invention will be described in detail below.

1. Porous Film (I)

The porous film (I) in the present invention contains a polyolefin resin. Since the porous film (I) contains a polyolefin resin, the porous film (I) has such a function that in abnormal temperature elevation occurs, a current is blocked by closing pores, resulting in prevention of a short-circuit between both electrodes in a nonaqueous electrolyte battery.

Examples of the polyolefin resin include polyethylene resins and polypropylene resins. The porous film (I) may contain two or more of these resins. Among them, polyethylene resins are preferable because they have higher electrical insulation property and ion permeability and a higher pore closing effect. The porous film (I) may contain other resins together with the polyolefin resin.

The melting point (softening point) of the resin forming the porous film (I) is preferably 150° C. or lower, more preferably 140° C. or lower, more preferably 130° C. or lower from the viewpoint of the function of closing the pores (pore blocking function) in abnormal temperature elevation in charge-discharge reaction. On the other hand, the melting point (softening point) is preferably 70° C. or higher, more preferably 800° C. or higher, still more preferably 100° C. or higher from the viewpoint of suppressing pore closing in a normal state. Here, the melting point (softening point) can be determined by differential scanning calorimetry (DSC) in accordance with JIS K 7121: 2012.

The weight average molecular weight of the polyolefin resin is preferably 300,000 or more, more preferably 400,000 or more, still more preferably 500,000 or more from the viewpoint of process workability, and mechanical strength (e.g. tensile strength, elastic modulus, elongation, puncture strength) with which the separator endures various external pressures generated at the time of winding the separator with electrodes.

The pore diameter of the porous film (I) is preferably 0.01 µm or more, more preferably 0.05 µm or more, still more preferably 0.1 µm or more from the viewpoint of securing ion permeability and suppressing deterioration of battery characteristics. On the other hand, the pore diameter of the porous film (I) is preferably 1.0 µm or less, more preferably 0.5 µm or less, still more preferably 0.3 µm or less from the viewpoint of enhancing the response of the pore closing function to the temperature.

The air resistance of the porous film (I) is preferably 500 s/100 cc Air or less, more preferably 400 s/100 cc Air or less, still more preferably 300 s/100 cc Air or less from the viewpoint of securing ion permeability and suppressing deterioration of battery characteristics, and is preferably 50 s/100 cc Air or more, more preferably 70 s/100 cc Air or more, still more preferably 100 s/100 cc Air or more for obtaining sufficient insulation quality in the battery. Here, the air resistance can be determined by a Gurley densometer (type B) manufactured by Tester Sangyo Co., Ltd. in accordance with JIS P 8117: 2009.

2. Porous Layer (II)

The porous layer (II) has a function of improving the shape stability of the separator at the time of heating. The porous layer (II) contains an inorganic filler, a water-soluble polymer having a structure represented by the general formula (1), a water-insoluble polymer and a basic compound. The porous layer (II) may further contain other components as necessary.

The porous layer (II) can be formed by preparing slurry containing as essential components an inorganic filler, a water-soluble polymer having a structure represented by the general formula (1), a water-insoluble polymer, a basic compound and a solvent, applying the slurry onto the porous layer (I), and performing drying. The solvent to be used for the slurry is water, but a small amount of an alcohol may be added from the viewpoint of drying property and applicability to the porous layer (I).

Details of the components will be described below.

[1] Inorganic Filler

Since the porous layer (II) contains an inorganic filler, the porous layer (II) has an effect of improving the shape stability at the time of heating the separator.

Examples of the inorganic filler may include inorganic fillers commonly referred to as filling materials. Examples of the filling material include alumina, boehmite, calcium carbonate, calcium phosphate, amorphous silica, crystalline glass fillers, kaolin, talc, titanium dioxide, silica-alumina composite oxide particles, calcium fluoride, lithium fluoride, zeolite, molybdenum sulfide and mica. The porous layer (II) may contain two or more of these materials. Among them, inorganic fillers selected from alumina and boehmite are preferable. Alumina and boehmite have high hydrophilicity on particle surfaces, so that the inorganic filler and the water-soluble polymer can be firmly bound by adding a small amount of the inorganic filler.

The average particle diameter of the inorganic filler is preferably 0.1 µm or more. When the average particle size is 0.1 µm or more, the specific surface area of the inorganic filler can be moderately reduced to decrease the amount of water adsorbed to the surface, and therefore water content of the separator can be reduced, so that battery characteristics can be further improved. On the other hand, the average particle diameter of the inorganic filler is preferably 2.0 µm or less, more preferably 1.0 µm or less. When the average particle diameter is 2.0 µm or less, the thickness of the porous layer (II) can be easily adjusted to a desired range as described later.

The term "average particle diameter" as used herein refers to a particle diameter at 50% (D50) in a volume-based cumulative fraction, which is measured within 10 minutes after a liquid obtained by adding an inorganic filler to water is circulated for 3 minutes while being irradiated with an ultrasonic wave under conditions of a flow rate of 45% and a power of 25 W using a laser scattering particle size distribution meter ("MT3300 EXII" manufactured by MicrotracBEL Corp. (formerly Nikkiso Co., Ltd.)).

[2] Water-Soluble Polymer

The water-soluble polymer has an effect of improving the shape stability of the separator at the time of heating by binding inorganic fillers together. Since the water-soluble polymer having a structure represented by the following general formula (1) has a rigid main chain structure, heat resistance can be improved. In addition, since the water-soluble polymer has an acidic functional group selected from a hydroxyl group, a carboxyl group and a sulfone group as $R^1$ and $R^2$ in the general formula (1), an ionic bond is formed with the basic compound, and the inorganic filler is firmly bonded through the ionic bond. These effects make it possible to improve the shape stability of the separator at the time of heating. The water solubility of the water-soluble polymer is developed in the coexistence of the structure represented by the general formula (1) and the basic compound.

[Chemical Formula 2]

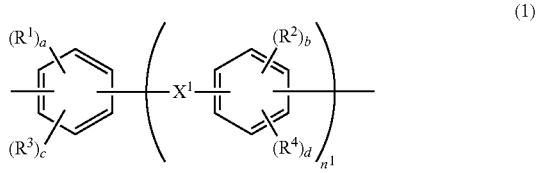

In the general formula (1), $R^1$ and $R^2$ each independently represent a hydroxyl group, a carboxyl group or a sulfonic acid group. $R^3$ and $R^4$ each independently represent a halogen, a nitro group or a monovalent organic group having 1 to 10 carbon atoms. a and b each independently represent an integer of 1 or more, and c and d each independently represent an integer of 0 or more. It is to be noted that a+c and b+d each independently represent an integer of 1 to 4. $n^1$ represents an integer of 0 to 3. $X^1$ represents a single bond, $CH_2$, $SO_2$, CO, O, S, $C(CH_3)_2$ or $C(CF_3)_2$. From the viewpoint of binding to the inorganic filler, $R^1$ and $R^2$ are each preferably a hydroxyl group or a carboxyl group, and c and d are each preferably 0.

The water-soluble polymer is preferably a polymer selected from polyimide, polyamide and polyamideimide because heat resistance can be further improved.

Preferably, the water-soluble polymer has a structural unit selected from a structural unit represented by the following general formula (2) and a structural unit represented by the following general formula (3) because heat resistance can be further improved.

[Chemical Formula 3]

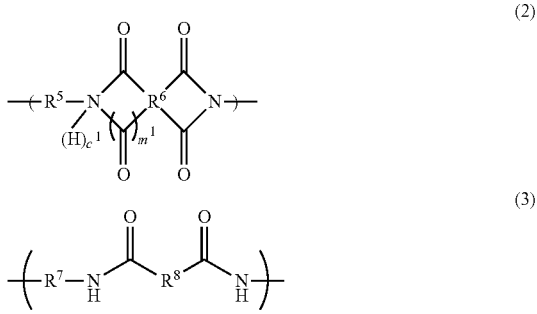

In the general formula (2), $R^5$ represents a divalent organic group having 2 to 50 carbon atoms, and $R^6$ represents a trivalent or tetravalent organic group having 2 to 50 carbon atoms. In general formula (2), $m^1$ and $c^1$ each represent 0 or 1, $c^1$ is 1 when $m^1$ is 0, and $c^1$ is 0 when $m^1$ is 1. In the general formula (3), $R^7$ and $R^8$ each independently represent a divalent organic group having 2 to 50 carbon atoms.

$R^6$ in the general formula (2) and $R^8$ in the general formula (3) may have either an aromatic or aliphatic skeleton, but it is preferable that these groups have an aliphatic skeleton because the water-solubility of the water-soluble polymer is improved, and the addition amount of the basic compound as a water-solubilizing agent can be reduced.

It is more preferable that at least 50 mol % of each of $R^5$ and $R^7$ in the general formulae (2) and (3) is a diamine residue represented by the general formula (1) because the inorganic filler can be more firmly bound to further improve shape stability at the time of heating. When the water-soluble polymer contains only one of the structural unit represented by the general formula (2) and the structural unit represented by the general formula (3), it is preferable that at least 50 mol % of one of $R^5$ and $R^7$ is diamine residue represented by the general formula (1). When the water-soluble polymer contains both the structural unit represented by the general formula (2) and the structural unit represented by the general formula (3), it is preferable that at least 50 mol % of the total of $R^5$ and $R^7$ is a diamine residue represented by the general formula (1), and it is more preferable that at least 50 mol % of each of $R^5$ and $R^7$ is a diamine residue represented by the general formula (1).

In the general formula (2), the water-soluble polymer is polyimide when $m^1$ is 1. Polyimide is an imide cyclized product of a polyamide acid which is a polycondensate of a diamine and a tetracarboxylic dianhydride, and contains a residue of a diamine and a residue of a tetracarboxylic dianhydride. In the general formula (2), $R^5$ represents a residue of a diamine, and $R^6$ represents a residue of a tetracarboxylic dianhydride.

Examples of the diamine having a structure represented by the general formula (1) include 3,5-diaminobenzoic acid, 3,4-diaminobenzoic acid, 5,5'-methylenebis(2-aminobenzoic acid), bis(3-amino-4-carboxyphenyl)sulfone, 2,2-bis(3-amino-4-carboxyphenyl)propane, 2,2-bis(3-amino-5-carboxyphenyl)propane, 2,2-bis(4-amino-3-carboxyphenyl)propane, 2,2-bis(3-amino-4-carboxyphenyl)hexafluoropropane, 2,2-bis(3-amino-5-carboxyphenyl)hexafluoropropane, 2,2-bis(4-amino-3-carboxyphenyl)hexafluoropropane, bis(3-amino-4-carboxyphenyl)ether, and these compounds having 1 to 4 hydrogen atoms replaced by hydroxyl groups, carboxyl groups or sulfonic acid groups. Two or more of these compounds may be used.

Examples of the diamine that does not have the structure represented by the general formula (1) include paraphenylene diamine, meta-phenylenediamine, 3,3'-diaminodiphenyl ether, 4,4'-diaminodiphenyl ether, 3,4'-diaminodiphenyl ether, 4,4'-diaminodiphenylmethane, 3,3'-diaminodiphenyl sulfone, 4,4'-diaminodiphenyl sulfone, 3,3'-diaminodiphenyl sulfide, 4,4'-diaminodiphenyl sulfide, 1,3-bis(4-aminophenoxy)benzene, 1,4-bis(4-aminophenoxy)benzene, 2,2'-bis(trifluoromethyl)benzidine, 9,9'-bis(4-aminophenyl)fluorene, hexamethylenediamine and 1,3-bis(3-aminopropyltetramethyldisiloxane). Two or more of these compounds may be used.

Examples of the tetracarboxylic dianhydride include aromatic tetracarboxylic anhydrides such as 4,4'-oxydiphthalic dianhydride, 3,3',4,4'-benzophenonetetracarboxylic dianhydride, pyromellitic dianhydride, 3,4,9,10-perylenetetracarboxylic dianhydride, 3,3',4,4'-diphenylsulfone tetracarboxylic dianhydride, 3,3',4,4'-biphenyltetracarboxylic dianhydride, 1,2,5,6-naphthalenetetracarboxylic dianhydride, 3,3',4,4'-para-terphenyltetracarboxylic dianhydride and 3,3',4,4'-meta-terphenyltetracarboxylic anhydride, aliphatic tetracarboxylic anhydrides such as 1,3,3a,4,5,9b-hexahydro-5-(tetrahydro-2,5-dioxo-3-furanyl)naphtho[1,2-c]furane-1,3-dione, bicyclo[2,2,2]oct-7-ene-2,3,5,6-tetracarboxylic dianhydride, 3-(carboxymethyl)-1,2,4-cyclopentane tricarboxylic 1,4:2,3-dianhydride, dicyclohexylmethane-3,3',4,4'-tetracarboxylic dianhydride, dicyclohexyl ether-3,3',4,4'-tetracarboxylic dianhydride, dicyclohexylketone-3,3',4,4'-tetracarboxylic anhydride and bicyclohexyl-3,3',4,4'-tetracarboxylic dianhydride, and these compounds having 1 to 4 hydrogen atoms replaced by hydroxyl groups, carboxyl groups or sulfonic acid groups. Two or more of these compounds may be used.

Preferably, the group $R^6$ has an aliphatic skeleton from the viewpoint of decreasing the necessary addition amount of the basic compound as a water solubilizing agent and suppressing the internal resistance at the time of preparing the battery. The term "aliphatic skeleton" used herein refers to a skeleton containing an acyclic or cyclic nonaromatic hydrocarbon. Examples of the acid dianhydride which gives $R^6$ preferable as an aliphatic skeleton include the above-mentioned aliphatic tetracarboxylic anhydrides, and these compounds having 1 to 4 hydrogen atoms replaced by hydroxyl groups, carboxyl groups or sulfonic acid groups. Two or more of these compounds may be used.

The polyimide having a structural unit represented by the general formula (2) can be obtained by, for example, performing polycondensation of the above-mentioned diamine and tetracarboxylic dianhydride in a solvent to obtain a polyamide acid, and then subjecting the polyamide acid to imide cyclization. As in normal polycondensation reaction, the polymerization degree of the generated polyamide acid increases, leading to an increase in molecular weight as the addition ratio (molar ratio) between the diamine and the tetracarboxylic dianhydride becomes closer to 1:1. The addition ratio (molar ratio) between the tetracarboxylic dianhydride and the diamine is preferably 100:50 to 150.

In addition, the end of the polyimide may be capped with a dicarboxylic anhydride such as maleic anhydride, phthalic anhydride, nadic anhydride, ethynyl phthalic anhydride or hydroxy phthalic anhydride; or a monoamine such as hydroxyaniline, aminobenzoic acid, dihydroxyaniline, carboxyhydroxyaniline or dicarboxyaniline.

The solvent to be used for the polycondensation reaction is not particularly limited as long as the generated polyamide acid is soluble in the solvent, and for example, an aprotic polar solvent such as N-methyl-2-pyrrolidone, N-methylcaprolactam, N,N-dimethylacetamide, N, N-dimethylformamide, dimethylsulfoxide, γ-butyrolactone and dimethylimidazoline; phenol-based solvents such as phenol, m-cresol, chlorophenol or nitrophenol; a phosphorus-based solvent with phosphorus pentaoxide added to polyphosphoric acid or phosphoric acid; or the like can be preferably used.

In general, a diamine and a tetracarboxylic dianhydride are reacted in such a solvent at a temperature of 100° C. or lower to obtain a polyamide acid which is a polyimide precursor. Thereafter, imidization cyclization is performed at a temperature preferably in a range of 100° C. to 300° C. to obtain a polyimide resin. In the imide cyclization, a base such as triethylamine, isoquinoline or pyridine can be added as a catalyst, or water produced as a byproduct can be azeotropically mixed with a nonpolar solvent such as toluene to be removed. Thereafter, the reaction solution is added in water or the like to precipitate polyimide, and the polyimide is dried, whereby a polyimide solid can be obtained. Alternatively, the polyamide acid is once added in a poor solvent such as water to obtain a polyamide acid solid, and the polyamide acid solid is subjected to heat treatment at a temperature of 100° C. to 500° C. to perform imide cyclization, whereby a polyimide resin solid can be obtained.

In the general formula (2), the water-soluble polymer is polyamideimide when $m^1$ is 0. Polyamideimide is an imide cyclized product of a polyamideamide acid which is a polycondensate of a diamine and a tricarboxylic acid, and contains a residue of a diamine and a residue of a tricarboxylic acid. $R^5$ in the general formula (2) represents a residue of a diamine, and $R^6$ represents a residue of a tricarboxylic acid.

Examples of the diamine include those exemplified above as the diamine forming the polyimide.

Examples of the tricarboxylic acid may include aromatic compounds such as trimellitic acid, hydroxytrimellitic acid, diphenyl ether tricarboxylic acid and diphenylsulfonetricarboxylic acid; aliphatic compounds such as dicyclohexyl ether tricarboxylic acid, dicyclohexylsulfonetricarboxylic acid, dicyclohexyl ether tricarboxylic acid and bicyclohexyltricarboxylic acid; acid anhydrides thereof; and phenol-substituted products of these compounds. Two or more of these compounds may be used.

In particular, from the viewpoint of reducing the necessary addition amount of the basic compound which is a water-solubilizing agent, and suppressing the internal resistance at the time of preparing a battery, it is preferable that the group $R^6$ has an aliphatic skeleton. The term "aliphatic skeleton" used herein refers to a skeleton containing an acyclic or cyclic nonaromatic hydrocarbon. Examples of the tricarboxylic acid which gives $R^6$ preferable as an aliphatic skeleton may include the above-mentioned aliphatic compounds, acid anhydrides thereof, and phenol-substituted products of these compounds. Two or more of these compounds may be used.

In addition, the tricarboxylic acid can be copolymerized with a dicarboxylic acid such as phthalic acid or hydroxyphthalic acid, or an anhydride thereof; other tricarboxylic acid such as trimesic acid or an anhydride thereof; or a tetracarboxylic acid such as pyromellitic acid, diphenyl ether tetracarboxylic acid, diphenylsulfone tetracarboxylic acid or biphenyltetracarboxylic acid or a hydroxyl group-substituted product thereof, or an anhydride thereof. When such other acid or acid anhydride is copolymerized, the amount thereof is preferably 50 mol % or less based on the total amount of acids and acid anhydrides.

The polyamideimide having a structural unit represented by the general formula (2) can be obtained by, for example, performing polycondensation of the above-mentioned diamine and tricarboxylic acid in a solvent to obtain a polyamideamide acid, and subjecting the polyamideamide acid to imide cyclization. As in the case of polyimide, the addition ratio (molar ratio) between the tricarboxylic acid and the diamine is preferably 100:50 to 150.

In addition, as in the case of polyimide, the end of the polyamideimide can be capped.

Examples of the solvent to be used in the polycondensation reaction may include those exemplified as solvents to be used for the polycondensation reaction of polyimide.

In general, a diamine and a tricarboxylic acid are reacted in such a solvent at a temperature of 100° C. or lower to obtain a polyamide acid which is a polyamideimide precursor. Thereafter, imidization cyclization is performed at a temperature preferably in a range of 100° C. to 300° C. to obtain a polyamideimide resin. In the imide cyclization, a base such as triethylamine, isoquinoline or pyridine can be added as a catalyst, or water produced as a byproduct can be azeotropically mixed with a nonpolar solvent such as toluene to be removed. Thereafter, the reaction solution is added in water or the like to precipitate polyamideimide, and the polyamideimide is dried, whereby a polyamideimide solid can be obtained. Alternatively, the polyamide acid is once added in a poor solvent such as water to obtain a polyamide acid solid, and the polyamide acid solid is subjected to heat treatment at a temperature of 100° C. to 500° C. to perform imide cyclization, whereby a polyamideimide resin solid can be obtained.

The polyamide having a structural unit represented by the general formula (3) is a polycondensate of a diamine and a dicarboxylic acid. $R^7$ in the general formula (3) represents a residue of a diamine, and $R^8$ represents a residue of a dicarboxylic acid.

Examples of the diamine include those exemplified above as the diamine forming the polyimide.

Examples of the dicarboxylic acid include aromatic dicarboxylic acids such as terephthalic acid, isophthalic acid, diphenyl ether dicarboxylic acid, naphthalenedicarboxylic acid and diphenylsulfonedicarboxylic acid; and aliphatic dicarboxylic acids such as cyclohexanedicarboxylic acid, dicyclohexyl ether dicarboxylic acid, dicyclohexylsulfonedicarboxylic acid and bicyclohexyldicarboxylic acid. Two or more of these compounds may be used.

In particular, from the viewpoint of reducing the necessary addition amount of the basic compound which is a water-solubilizing agent, and suppressing the internal resistance at the time of preparing a battery, it is preferable that the group $R^8$ has an aliphatic skeleton. The term "aliphatic skeleton" used herein refers to a skeleton containing an acyclic or cyclic nonaromatic hydrocarbon. Examples of the dicarboxylic acid which gives $R^8$ preferable as an aliphatic skeleton may include the above-mentioned aliphatic dicarboxylic acids. Two or more of these compounds may be used.

The polyamide having a structural unit represented by the general formula (3) can be obtained by, for example, performing polycondensation of the above-mentioned diamine and dicarboxylic acid in a solvent. As in the case of polyimide, the addition ratio (molar ratio) between the dicarboxylic acid and the diamine is preferably 100:50 to 150.

Examples of the solvent to be used in the polycondensation reaction may include those exemplified as solvents to be used for the polycondensation reaction of polyimide.

In general, an acid chloride or active ester of a dicarboxylic acid and a diamine are reacted in such a solvent at a temperature of 30° C. or lower to obtain polyamide. In the reaction, a base such as triethylamine or pyridine can be added as a catalyst. Thereafter, the reaction solution is added in water or the like to precipitate polyamide, and the polyamide is dried, whereby a polyamide solid can be obtained.

The weight average molecular weight of the water-soluble polymer is preferably as large as possible within the bounds of securing water solubility because the shape stability of the separator at the time of heating can be improved. The weight average molecular weight of the water-soluble polymer is preferably 20,000 or more, more preferably 25,000 or more. The preferred upper limit of the weight average molecular weight is 200,000 or less from the viewpoint of water solubility.

The weight average molecular weight is a value which is measured by GPC (gel permeation chromatography) and determined in terms of polystyrene. The weight-average molecular weight of the water-soluble polymer was measured under the following conditions.
1) Equipment or apparatus: Waters 2690
2) Column: TSK-GEL (d-4000 & d-2500) from TOSOH CORPORATION
3) Solvent: NMP
4) Flow rate: 0.4 mL/min
5) Sample concentration: 0.05 to 0.1 wt %
6) Injection volume: 50 μL
7) Temperature: 40° C.
8) Detector: Waters 996 As polystyrene for use in conversion, standard polystyrene from Polymer Laboratories Ltd. was used.

The content of the water-soluble polymer in the porous layer (II) is preferably 0.4 to 5.0 parts by mass based on 100 parts by mass of the inorganic filler. When the content of the water-soluble polymer is 0.4 parts by mass or more, the inorganic filler can be firmly bound to further improve the shape stability of the separator at the time of heating. On the other hand, when the content of the water-soluble polymer is 5.0 parts by mass or less, clogging of the porous film (I) can be reduced to suppress an increase in air resistance of the separator.

[3] Water-Insoluble Polymer

The water-insoluble polymer has an effect of suppressing separation of the porous layer (II) from the porous film (I).

The water-insoluble polymer is preferably an electrochemically stable material that has electrical insulation property, is stable to a nonaqueous electrolyte, and is hardly oxidized and reduced in a battery operating voltage range. Examples of the material include styrene resins [polystyrene (PS) etc.], styrene-butadiene rubber (SBR), acrylic resins (PMMA etc.), polyalkylene oxides [polyethylene oxide (PEO) etc.], fluororesins (PVDF etc.) and derivatives thereof. These resins may be crosslinked with a urea resin, polyurethane or the like. Two or more of these resins may be used. Among them, styrene resins, acrylic resins and fluororesins are preferable, with acrylic resins being more preferable. An acrylic resin has a low glass transition temperature (Tg) and high flexibility, and is therefore capable of more effectively suppressing separation of the porous layer (II) from the porous film (I). A resin having a low Tg and high flexibility tends to have low shape stability at the time of heating, but since the porous layer (II) contains the water-soluble polymer, it is possible to more reliably suppress separation of the porous layer (II) from the porous film (I) while softening at a high temperature is suppressed to improve shape stability at the time of heating.

The content of the water-insoluble polymer in the porous layer (II) is preferably 0.5 to 5.0 parts by mass based on 100 parts by mass of the inorganic filler. When the content of the water-insoluble polymer is 0.5 parts by mass or more, the porous layer (II) is firmly bound to the porous film (I) even at the time of heating, and therefore the shape stability of the separator can be further improved. On the other hand, when the content of the water-insoluble polymer is 5.0 parts by mass or less, clogging of the porous film (I) can be reduced to suppress an increase in air resistance of the separator.

[4] Basic Compound

The basic compound has an effect of improving the binding property to the inorganic filler by forming an ionic bond with the water-soluble polymer containing a structure represented by the general formula (1).

Examples of the basic compound include alkali metal compounds, alkaline earth metal compounds, quaternary ammonium compounds having 1 to 20 carbon atoms, and amine compounds having 1 to 20 carbon atoms. From the viewpoint of ionic bondability with the water-soluble polymer, the basic compound is preferably at least one compound selected from an alkali metal compound, a quaternary ammonium compound having 1 to 20 carbon atoms, and an amine compound having 1 to 20 carbon atoms.

Examples of the alkali metal compound include hydroxides of alkali metal, carbonates and phosphates.

Examples of the hydroxide of an alkali metal include lithium hydroxide, sodium hydroxide, potassium hydroxide, rubidium hydroxide and cesium hydroxide. Two or more of these compounds may be contained. From the viewpoint of the solubility and stability of the water-soluble polymer, the hydroxide of an alkali metal is more preferably a compound selected from lithium hydroxide, sodium hydroxide and potassium hydroxide.

Examples of the carbonate of an alkali metal include lithium carbonate, lithium hydrogencarbonate, sodium carbonate, sodium hydrogencarbonate, potassium carbonate, potassium hydrogencarbonate, rubidium hydrogencarbonate, cesium carbonate, cesium hydrogencarbonate and potassium sodium carbonate. Two or more of these resins may be used. From the viewpoint of the solubility and stability of the water-soluble polymer, the carbonate of an alkali metal is more preferably a compound selected from sodium carbonate, sodium hydrogencarbonate, potassium carbonate, potassium hydrogencarbonate and potassium sodium carbonate.

Examples of the phosphate of an alkali metal include lithium phosphate, lithium hydrogenphosphate, lithium dihydrogenphosphate, sodium phosphate, sodium hydrogenphosphate, sodium dihydrogenphosphate, potassium phosphate, potassium hydrogenphosphate, potassium dihydrogenphosphate, rubidium phosphate, rubidium hydrogenphosphate, rubidium dihydrogenphosphate, cesium phosphate, cesium hydrogenphosphate, cesium dihydrogenphosphate, potassium sodium phosphate and potassium sodium hydrogenphosphate. Two or more of these resins may be used. From the viewpoint of the solubility and stability of the water-soluble polymer, the phosphate of an alkali metal is preferably a compound selected from sodium phosphate, sodium hydrogenphosphate, potassium phosphate, potassium hydrogenphosphate, potassium sodium phosphate and potassium sodium hydrogenphosphate.

Examples of the amine compound having 1 to 20 carbon atoms include aliphatic tertiary amines such as trimethylamine, triethylamine, triisopropylamine, tributylamine, triethanolamine and N-methylethanolamine; aromatic amines such as pyridine, N,N-dimethylaminopyridine and lutidine. Two or more of these compounds may be used.

Examples of the quaternary ammonium compound having 1 to 20 carbon atoms include quaternary ammonium salts such as tetramethylammonium hydroxide and tetraethylammonium hydroxide. Two or more of these compounds may be used.

From the viewpoint of the solubility of the water-soluble polymer, the content of the basic compound in the porous layer (II) is preferably 0.2 mole equivalent or more, more preferably 0.5 mole equivalent or more based on the amount of acidic functional groups in the water-soluble polymer. On the other hand, when the content of the basic compound is more than 4 mole equivalent, the internal resistance of the battery may increase, leading to a decrease in charge-discharge rate; and therefore the content of the basic compound is preferably 4 mole equivalent or less. In addition, the content of the basic compound is still more preferably 3 mole equivalent or less from the viewpoint of suppressing decomposition of the water-soluble polymer and deterioration of the binding property between the water-soluble polymer and the inorganic filler.

The porous layer (II) may contain various additives other than the above-mentioned components, such as, for example, an antioxidant, a preservative, a surfactant and the like as necessary.

The thickness of the porous layer (II) is preferably 1 μm or more, more preferably 2 μm or more from the viewpoint of securing film breaking strength and insulating quality at the time when the porous film (I) is melted and shrunk at a temperature equal to or higher than melting point. On the other hand, from the viewpoint of increasing the capacity of the nonaqueous electrolyte battery, the film thickness is preferably 10 μm or less, more preferably 5 μm or less.

3. Nonaqueous Electrolyte Battery Separator

The nonaqueous electrolyte battery separator of the present invention includes the porous film (I) and the porous layer (II). Preferably, the porous layer (II) is formed on one surface or both surfaces of the porous film (I).

The air permeation increase degree of the nonaqueous electrolyte battery separator is preferably +200 s/100 cc Air or less, more preferably less than +100 s/100 cc Air. When the air permeation increase degree is +200 s/100 cc Air or less, ion permeability can be secured to suppress deterioration of battery characteristics.

Here, the air permeation increase degree is a value indicating an amount in which air resistance of the separator including the porous film (I) and the porous layer (II) increases with respect to the air resistance of the porous film (I) alone. The air resistance is measured in accordance with JIS P 8117: 2009 using a Gurley densometer (type B) manufactured by Tester Sangyo Co., Ltd. The porous film (I) and the separator are each fixed in such a manner that there are no creases between a clamping plate and an adapter plate, the air resistance is measured, and the air permeation increase degree can be calculated from the following equation.

Air permeation increase degree (s/100 cc Air)= {Air resistance of separator (s/100 cc Air)}− {air resistance of porous film (I) (s/100 cc Air)}

Examples of means for setting the air permeation increase degree to +200 s/100 cc Air or less include a method in which clogging of the porous film (I) is reduced by, for example, adjusting the content of each of the water-soluble polymer and the water-insoluble polymer to the above-mentioned preferred range.

The thermal shrinkage ratio of the nonaqueous electrolyte battery separator is preferably 5% or less, more preferably less than 3%. The thermal shrinkage ratio is an index of shape stability at the time of heating, and as long as the thermal shrinkage ratio is 5% or less, it is possible to suppress a situation in which thermal shrinkage of the separator causes a positive electrode and a negative electrode to come into contact with each other, resulting in occurrence of a short-circuit even at the time of abnormal heat generation in the battery.

Here, the thermal shrinkage ratio refers to a ratio of the length of the separator after heating at a predetermined temperature to the length of the separator at room temperature. The nonaqueous electrolyte battery separator is cut to a size of 50 mm×50 mm, and a marking with a length of 30 mm is then made in each of a side in a machine direction (MD) and a side in a traverse direction (TD) on the porous film (I) side. The separator with the markings is placed in an oven heated to a predetermined temperature (150° C., 160° C. or 200° C.) with the separator sandwiched between sheets of paper, and the separator is heated for 1 hour. Thereafter, the nonaqueous electrolyte battery separator is taken out from the oven, and cooled to room temperature, the length of the marking in each of MD and TD is then measured, and the thermal shrinkage ratio is calculated from the following equation where the length of the shorter marking portion is d (mm).

Heat shrinkage ratio (%)={(30−d)/30}×100

Examples of means for setting the thermal shrinkage ratio to 5% or less include a method in which the content of the water-soluble polymer is adjusted to the above-mentioned preferred range.

4. Method for Producing Nonaqueous Electrolyte Battery Separator

The nonaqueous electrolyte battery separator of the present invention can be obtained by, for example, applying to at least one surface of the porous film (I) the above-mentioned coating liquid containing an inorganic filler, a water-soluble polymer, a water-insoluble polymer, a basic compound and a solvent, and then removing the solvent to form a porous layer (II). Details thereof will be described below.

[1] Method for Producing Coating Liquid

Preferably, the coating liquid is produced by adding an inorganic filler to an aqueous solution obtained by dissolving a water-soluble polymer and a basic compound in water, mixing and dispersing the mixture, adding a water-insoluble polymer, and mixing the mixture. A small amount of an alcohol may be added to water from the viewpoint of drying property and applicability to the porous layer (I).

Examples of the method for mixing and dispersing the inorganic filler include a mechanical stirring method, an ultrasonic dispersion method, a high-pressure dispersion method and a medium dispersion method. Among them, the media dispersion method is preferable in which the inorganic filler can be highly dispersed, and the inorganic filler and the water-soluble polymer can be adapted to each other in a short time.

[2] Method for Producing Porous Film (I)

Examples of the method for producing the porous film (I) include a foaming method, a phase separation method, a dissolution and recrystallization method, a stretching and pore opening method and a powder sintering method. Among them, the phase separation method is preferable from the viewpoint of uniformity of fine pores and cost.

Examples of the method for producing the porous film (I) by a phase separation method include a method in which polyethylene and a molding solvent are heated, melted and kneaded, the resulting molten mixture is extruded from a die, and cooled to form a gel-like molded product, the resulting gel-like molded product is stretched in at least a uniaxial direction, and the molding solvent is removed to obtain a porous film.

[3] Method for Forming Porous Layer (II)

Preferably, the coating liquid obtained in [1] is applied to at least one surface of the porous film (I) obtained in [2], and the solvent is removed to form the porous layer (II).

Examples of the method for applying the coating liquid to the porous film (I) include a gravure coater method, a small-diameter gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, a screen printing method and a spray coating method.

Examples of the method for removing the solvent include a method in which the porous film (I) is heated and dried, or dried under reduced pressure, at a temperature equal to or lower than the melting point of the porous film (I) while being fixed. Among them, a method in which the porous film (I) is heated and dried is preferable because the process is simplified.

The heating and drying temperature is preferably 70° C. or lower, more preferably 60° C. or lower, still more preferably 50° C. or lower from the viewpoint of suppressing development of the pore closing function of the porous film (I) and reducing the use amount of heat. The heating and drying time is preferably several seconds to several minutes.

5. Nonaqueous Electrolyte Battery

The nonaqueous electrolyte battery separator of the present invention can be suitably used for a battery using a nonaqueous electrolyte. Specifically, the nonaqueous electrolyte battery separator can be preferably used as a separator of a secondary battery such as a nickel-hydrogen battery, a nickel-cadmium battery, a nickel-zinc battery, a silver-zinc battery, a lithium secondary battery, a lithium ion secondary battery or a lithium polymer secondary battery. In particular, it is preferable to use the nonaqueous electrolyte battery separator as a separator of a lithium ion secondary battery.

In a nonaqueous electrolyte battery, a positive electrode and a negative electrode are laminated with a separator interposed therebetween. The separator contains an electrolytic solution (electrolyte). The structure of the electrode is not particularly limited, and examples thereof include an electrode structure in which disk-shaped positive and negative electrodes are disposed so as to face each other (coin type); an electrode structure in which plate-shaped positive and negative electrodes are alternately laminated (lamination type); and an electrode structure in which laminated band-like positive and negative electrodes are wound (winding type). The current collector, the positive electrode, the positive active material, the negative electrode, the negative active material and the electrolyte solution, which are used in the nonaqueous electrolyte battery, are not particularly limited, and previously known materials can be used in combination as appropriate.

EXAMPLES

The present invention will now be described by way of examples.

A method for preparing a water-soluble polymer will be described below.

Synthesis Example 1: Synthesis of Polyimide Resin A

In a well-dried four-necked round bottom flask, 280.00 g of N-methylpyrrolidone (NMP) and 14.44 g (95 mmol) of 3,5-diaminobenzoic acid (3,5-DAB manufactured by Tokyo Chemical Industry Co. Ltd.), and 1.24 g (5 mmol) of 1,3-bis-3-aminopropyltetramethyldisiloxane (APDS manufactured by Dow Corning Toray Co., Ltd.) were dissolved with stirring under a nitrogen atmosphere. Thereafter, the solution was cooled with stirring, and 31.00 g (100 mmol) of 3,3',4,4'-diphenyl ether tetracarboxylic dianhydride (ODPA manufactured by Tokyo Chemical Industry Co., Ltd.) was added dropwise while being kept at 50° C. or lower. After the whole amount of the 3,3',4,4'-diphenyl ether tetracarboxylic dianhydride was added dropwise, the mixture was reacted at 50 to 60° C. for 1 hour, 0.10 g of isoquinoline and 30 mL of toluene were then added, the temperature of the solution was elevated to 180° C., and the reaction was carried out while distilled water was removed. After completion of the reaction, the temperature of the solution was lowered to room temperature, the solution was added in 5 L of water, and the resulting precipitate was separated by filtration to obtain a yellowish white solid. The solid was washed with 1 L of water three times, and then dried in a ventilation oven at 50° C. for 3 days to obtain a polyimide resin A having a structural unit represented by the general formula (2), where 95 mol % of $R^5$ is a diamine residue represented by the general formula (1). The weight average molecular weight was 22,000.

Synthesis Example 2: Synthesis of Polyimide Resin B

Except that 14.44 g (95 mmol) of 3,5-DAB was changed to 9.88 g (95 mmol) of meta-phenylenediamine (MDA manufactured by Tokyo Chemical Industry Co., Ltd.), the same procedure as in Synthesis Example 1 was carried out to obtain a polyimide resin B which did not have a structure represented by the general formula (1). The weight average molecular weight was 23,000.

Synthesis Example 3: Synthesis of Polyimide Resin C

Except that 14.44 g (95 mmol) of 3,5-DAB and 1.24 g (5 mmol) of APDS were changed to 31.10 g (85 mmol) of 2,2-bis (3-amino-4-hydroxyphenyl)hexafluoropropane (trade name "AZ 6F-AP" manufactured AZ Electronic Materials, 6FAP) and 3.27 g (30 mmol) of 3-aminophenol (AMP manufactured by Tokyo Chemical Industry Co., Ltd.), the same procedure as in Synthesis Example 1 was carried out to obtain a polyimide resin C in which the end was capped with 3-aminophenol, the polyimide resin C having a structural unit represented by the general formula (2), where the whole of $R^5$ is a diamine residue represented by the general formula (1). The weight average molecular weight was 24,000.

Synthesis Example 4: Synthesis of Polyimide Resin D

In a well-dried four-necked round bottom flask, 80.00 g of NMP, 3.66 g (10 mmol) of 6FAP, and 2.00 g (10 mmol) of 4,4'-diaminodiphenyl ether (manufactured by Wakayama Seika Kogyo Co., Ltd.; trade name "Kou DA"; 4,4'-DAE) were dissolved with stirring under a nitrogen atmosphere. Thereafter, the solution was cooled with stirring, and 14.28 g (20 mmol) of an acid anhydride (TMDA) represented by the structural formula (4) and synthesized in accordance with the method described in Synthesis Example 1 in Japanese Patent Laid-open Publication No. 11-100503 was added dropwise while being kept at 50° C. or lower. After the whole amount of the acid anhydride was added dropwise, the mixture was reacted at 50 to 60° C. for 1 hour, the temperature of the solution was then elevated to 180° C., and the reaction was carried out while distilled water was removed. After completion of the reaction, the temperature of the solution was lowered to room temperature, the solution was added in 1 L of water, and the resulting precipitate was separated by filtration to obtain a yellowish white solid. The solid was washed with 1 L of water three times, and then dried in a ventilation oven at 50° C. for 3 days to obtain a polyimide resin D having a structural unit represented by the general formula (2), where 50 mol % of $R^5$ is a diamine residue represented by the general formula (1). The weight average molecular weight was 25,000.

[Chemical Formula 4]

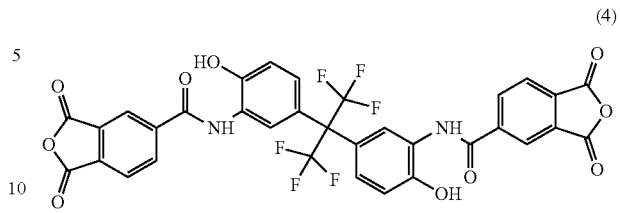

(4)

Synthesis Example 5: Synthesis of Polyimide Resin E

Except that the addition amount of 6FAP was changed to 1.83 g (5 mmol), and the addition amount of 4,4'-DAE was changed to 3.00 g (15 mmol), the same procedure as in Synthesis Example 4 was carried out to obtain a polyimide resin E having a structural unit represented by the general formula (2), where 25 mol % of $R^5$ is a diamine residue represented by the general formula (1). The weight average molecular weight was 23,000.

Synthesis Example 6: Synthesis of Polyimide Resin F

Except that the diamine was changed to 28.63 g (100 mmol) of 3,3'-dicarboxy-4,4'-diaminodiphenylmethane (trade name "MBAA" manufactured by Wakayama Seika Kogyo Co., Ltd.), and the acid anhydride was changed to 44.40 g (100 mmol) of 2,2-bis(3,4-dicarboxyphenyl) hexafluoropropane dianhydride (6FDA manufactured by Daikin Industries, Ltd.), the same procedure as in Synthesis Example 1 was carried out to obtain a polyimide resin E having a structural unit represented by the general formula (2), where the whole of $R^5$ is a diamine residue represented by the general formula (1). The weight average molecular weight was 23,000.

Synthesis Example 7: Synthesis of Polyamideimide Resin A

In a well-dried four-necked round bottom flask, 48.0.00 g of NMP, 10.10 g (100 mmol) of triethylamine, 10.00 g (50 mmol) of 4,4'-DAE and 6.90 g (50 mmol) of 3,5-DAB were dissolved with stirring under a nitrogen atmosphere. Thereafter, the solution was cooled to −20° C. with stirring, and a solution obtained by dissolving 21.05 g (100 mmol) of trimellitic anhydride chloride (manufactured by Tokyo Chemical Industry Co., Ltd., hereinafter referred to as TMC) in 200.00 g of NMP was gradually added dropwise while being kept at 0° C. After the whole amount of the solution was added dropwise, the mixture was reacted at −20° C. for 2 hours, and the solution was then brought to room temperature, and stirred for 1 hour. The solution was added in 10 L of water, and the resulting precipitate was separated by filtration to obtain a yellowish white solid. The solid was washed with 1 L of water three times, and then dried in a ventilation oven at 50° C. for 3 days to obtain a polyamideimide resin A having a structural unit represented by the general formula (2), where 50 mol % of $R^5$ is a diamine residue represented by the general formula (1). The weight average molecular weight was 24,000.

Synthesis Example 8: Synthesis of Polyamideimide Resin B

Except that the addition amount of 4,4'-DAE was changed to 20.00 g (100 mmol), and 3,5-DAB was not used, the same procedure as in Synthesis Example 6 was carried out to obtain a polyamideimide resin B which did not have a structure represented by the general formula (1). The weight average molecular weight was 23,000.

Synthesis Example 9: Synthesis of Polyamide Resin A

In a well-dried four-necked flask, 28.63 g (100 mmol) of MBAA was dissolved in 131.79 g of NMP with stirring under a nitrogen atmosphere. Thereafter, the solution was cooled on ice with stirring, and to this solution, a solution obtained by dissolving 20.30 g (100 mmol) of isophthaloyl chloride (IPC manufactured by Tokyo Chemical Industry Co., Ltd.) in 15.00 g of NMP was added while being kept at 30° C. or lower. After the whole amount of the solution was added dropwise, the mixture was reacted at 30° C. for 4 hours. The solution was added in 3 L of water, and the resulting precipitate was separated by filtration, and washed with 1.5 L of water three times. The washed solid was dried in a ventilation oven at 50° C. for 3 days to obtain a polyamide resin A having a structural unit represented by the general formula (3), where the whole of $R^7$ is a diamine residue represented by the general formula (1). The weight average molecular weight was 21,000.

Synthesis Example 10: Synthesis of Polyamide Resin B

Except that the diamine was changed to 7.61 g (50 mmol) of 3,5-DAB and 10.01 g (50 mmol) of 4,4'-DAE, and the addition amount of IPC was changed to 19.90 g (98 mmol), the same procedure as in Synthesis Example 9 was carried out to obtain a solid of a polyamide resin B having a structural unit represented by the general formula (3), where 50 mol % of $R^7$ is a diamine residue represented by the general formula (1). The weight average molecular weight was 21,000.

Synthesis Example 11: Synthesis of Polyamide Resin C

Except that the diamine was changed to 32.96 g (90 mmol) of 6FAP and 1.52 g (10 mmol) of 3,5-DAB, and the acid chloride was changed to 20.30 g (100 mmol) of terephthalic acid chloride (manufactured by Tokyo Chemical Industry Co., Ltd., hereinafter referred to as TPC), the same procedure as in Synthesis Example 9 was carried out to obtain a solid of a polyamide resin C having a structural unit represented by the general formula (3), where the whole of $R^7$ is a diamine residue represented by the general formula (1). The weight average molecular weight was 23,000.

Synthesis Example 12: Synthesis of Polyamide Resin D

Except that the diamine was changed to 22.90 g (80 mmol) of MBAA and 3.60 g (18 mmol) of 4,4'-DAE, and the acid chloride was changed to 25.31 g (100 mmol) of 2,6-naphthalene dicarboxylic acid chloride (manufactured by Iharanikkei Chemical Industry Co., Ltd., trade name "26 NADOC", NDCC), the same procedure as in Synthesis Example 9 was carried out to obtain a solid of a polyamide resin D having a structural unit represented by the general formula (3), where the 82 mol % of $R^7$ is a diamine residue represented by the general formula (1). The weight average molecular weight was 22,000.

Synthesis Example 13: Synthesis of Polyamide Resin E

Except that the diamine was changed to 36.63 g (100 mmol) of 6FAP, and the acid chloride was changed to 25.18 g (99.5 mmol) of NDCC, the same procedure as in Synthesis Example 9 was carried out to obtain a polyamide resin E having a structural unit represented by the general formula (3), where the whole of $R^7$ is a diamine residue represented by the general formula (1). The weight average molecular weight was 25,000.

Synthesis Example 14: Synthesis of Polyamide Resin F

Except that the diamine was changed to 20.02 g (100 mmol) of 4,4'-DAE and the acid chloride was changed to 20.30 g (100 mmol) of IPC, the same procedure as in Synthesis Example 9 was carried out to obtain a solid of a polyamide resin F which did not have a structure represented by the general formula (1). The weight average molecular weight was 23,000.

Synthesis Example 15: Synthesis of Polyimide Resin G

In a well-dried four-necked flask, 28.63 g (100 mmol) of 3,3'-dicarboxy-4,4'-diaminodiphenylmethane (trade name "MBAA" manufactured by Wakayama Seika Kogyo Co., Ltd.) was added to 131.79 g of NMP, and dissolved with stirring under a nitrogen atmosphere at room temperature. Thereafter, 30.00 g (100 mmol) of 1,3,3a,4,5,9b-hexahydro-5(tetrahydro-2,5-dioxo-3-furanyl)naphtho[1,2-c]furan-1,3-dione (trade name "RIKACID TDA-100" manufactured by New Japan Chemical Co., Ltd.) and 15.00 g of NMP were added, and the mixture was reacted at 40° C. for 1 hour, and then subjected to a polymerization reaction at 200° C. for 6 hours while water generated during the reaction was distilled off. After completion of the reaction, the temperature was lowered to room temperature, the solution was added in 3 L of water, and the resulting precipitate was separated by filtration, and washed with 1.5 L of water three times. The washed solid was dried in a ventilation oven at 50° C. for 3 days to obtain a polyimide resin G having a structural unit represented by the general formula (2), where the 100 mol % of $R^5$ is a diamine residue represented by the general formula (1). The weight average molecular weight was 28,000.

Synthesis Example 16: Synthesis of Polyimide Resin H

Except that the acid chloride was changed to 24.82 g (100 mmol) of bicyclo[2,2,2]oct-7-ene-2,3,5,6-tetracarboxylic acid dianhydride (manufactured by Tokyo Chemical Industry Co., Ltd., hereinafter referred to as BOE), the same procedure as in Synthesis Example 15 was carried out to obtain a polyimide resin H having a structural unit represented by the general formula (2), where 100 mol % of $R^5$ is a diamine residue represented by the general formula (1). The weight average molecular weight was 30,000.

Synthesis Example 17: Synthesis of Polyimide Resin J

Except that the acid anhydride was changed to 22.42 g (100 mmol) of 3-(carboxymethyl)-1,2,4-cyclopentane tricarboxylic 1,4:2,3-dianhydride (manufactured by Tokyo Chemical Industry Co., Ltd., hereinafter referred to as JPDA), the same procedure as in Synthesis Example 15 was carried out to obtain a polyimide resin J having a structural unit represented by the general formula (2), where 100 mol % of $R^5$ is a diamine residue represented by the general formula (1). The weight average molecular weight was 31,000.

The compositions of resins synthesized in Synthesis Examples 1 to 17 are shown in Table 1.

Resin aqueous solutions 2 to 6, 9 to 12, 15, 17, 18, 20, 21, 23 to 31, 33 to 35 Except that the addition amount was changed as shown in Table 2, the same procedure as in the method for preparing the resin aqueous solution 1 was carried out to obtain a resin aqueous solution. In Table 2, DMAE denotes dimethylaminoethanol, DMAB denotes dimethylaminobutanol, TMAH denotes tetramethylammonium hydroxide, and $NEt_3$ denotes triethylamine.

Resin Aqueous Solution 7

An attempt was made to prepare a resin aqueous solution in the same manner as in the method for preparing the resin aqueous solution 1 except that sodium hydroxide was not added, but the polyimide resin did not dissolved.

Resin Aqueous Solution 8

An attempt was made to prepare a resin aqueous solution in the same manner as in the method for preparing the resin aqueous solution 1 except that 10.00 g of the polyimide resin A obtained in Synthesis Example 1 was changed to 10.00 g

TABLE 1

| | | Diamine having a structure represented by general formula (1) | | Other diamines | | Monoamine | | Acid anhydride or acid chloride | |
|---|---|---|---|---|---|---|---|---|---|
| | | Type | Composition ratio | Type | Composition ratio | Type | Composition ratio | Type | Composition ratio |
| Synthesis Example 1 | Polyimide resin A | 3,5-DAB | 95 mmol | APDS | 5 mmol | — | — | ODPA | 100 mmol |
| Synthesis Example 2 | Polyimide resin B | — | — | MDA APDS | 95 mmol 5 mmol | — | — | ODPA | 100 mmol |
| Synthesis Example 3 | Polyimide resin C | 6FAP | 85 mmol | — | — | AMP | 30 mmol | ODPA | 100 mmol |
| Synthesis Example 4 | Polyimide resin D | 6FAP | 10 mmol | 4,4'-DAE | 10 mmol | — | — | TMDA | 20 mmol |
| Synthesis Example 5 | Polyimide resin E | 6FAP | 5 mmol | 4,4'-DAE | 15 mmol | — | — | TMDA | 20 mmol |
| Synthesis Example 6 | Polyimide resin F | MBAA | 100 mmol | — | — | — | — | 6FDA | 100 mmol |
| Synthesis Example 7 | Polyamideimide resin A | 3,5-DAB | 50 mmol | 4,4'-DAE | 50 mmol | — | — | TMC | 100 mmol |
| Synthesis Example 8 | Polyamideimide resin B | — | — | 4,4'-DAE | 100 mmol | — | — | TMC | 100 mmol |
| Synthesis Example 9 | Polyamide resin A | MBAA | 100 mmol | — | — | — | — | IPC | 100 mmol |
| Synthesis Example 10 | Polyamide resin B | 3,5-DAB | 50 mmol | 4,4'-DAE | 50 mmol | — | — | IPC | 98 mmol |
| Synthesis Example 11 | Polyamide resin C | 6FAP 3,5-DAB | 90 mmol 10 mmol | — | — | — | — | TPC | 100 mmol |
| Synthesis Example 12 | Polyamide resin D | MBAA | 80 mmol | 4,4'-DAE | 18 mmol | — | — | NDCC | 100 mmol |
| Synthesis Example 13 | Polyamide resin E | 6FAP | 100 mmol | — | — | — | — | NDCC | 99.5 mmol |
| Synthesis Example 14 | Polyamide resin F | — | — | 4,4'-DAE | 100 mmol | — | — | IPC | 100 mmol |
| Synthesis Example 15 | Polyimide resin G | MBAA | 100 mmol | — | — | — | — | TDA100 | 100 mmol |
| Synthesis Example 16 | Polyimide resin H | MBAA | 100 mmol | — | — | — | — | BOE | 100 mmol |
| Synthesis Example 17 | Polyimide resin J | MBAA | 100 mmol | — | — | — | — | JPDA | 100 mmol |

A method for preparing a resin aqueous solution containing a water-soluble polymer and a basic compound will be described below. The solubility of the water-soluble polymer in water was evaluated by visual observation of the prepared aqueous solution. A sample with no turbidity was rated good, and a sample with turbidity was rated poor.

Resin Aqueous Solution 1

10.00 g of the polyimide resin A obtained in Synthesis Example 1 and 0.94 g (0.02 mol) of sodium hydroxide were mixed, 100.00 g of water was added to the mixture, and the mixture was heated to 50° C., and stirred to obtain a resin aqueous solution 1.

of the polyimide resin B obtained in Synthesis Example 2, but the polyimide resin did not dissolved.

Resin Aqueous Solution 13

An attempt was made to prepare a resin aqueous solution by adding 1000.00 g of water to 10.00 g of the polyimide resin C obtained in Synthesis Example 3, heating the mixture to 50° C., and stirring the mixture without adding a basic compound, but the polyimide resin was not dissolved.

Resin Aqueous Solution 14

An attempt was made to prepare a resin aqueous solution by mixing 10.00 g of the polyimide resin A obtained in Synthesis Example 1 and 0.87 g (0.01 mol) of potassium hydroxide, adding 1000.00 g of water to the mixture, heating the mixture to 50° C., and stirring the mixture, but a part of the polyimide resin was not dissolved.

Resin Aqueous Solution 16

An attempt was made to prepare a resin aqueous solution by adding 200.00 g of water to 10.00 g of the polyimide resin D obtained in Synthesis Example 4, heating the mixture to 50° C. and stirring the mixture without adding a basic compound, but the polyimide resin was not dissolved.

Resin Aqueous Solution 19

An attempt was made to prepare a resin aqueous solution by mixing 10.00 g of the polyimide resin F obtained in Synthesis Example 6 and 0.30 g (0.005 mol) of potassium hydroxide, adding 500.00 g of water to the mixture, heating the mixture to 50° C., and stirring the mixture, but a part of the polyimide resin was not dissolved.

Resin Aqueous Solution 22

An attempt was made to prepare a resin aqueous solution by mixing 10.00 g of the polyamideimide resin B obtained in Synthesis Example 8 and 0.32 g (0.008 mol) of sodium hydroxide, adding 100.00 g of water to the mixture, heating the mixture to 50° C., and stirring the mixture, but the polyamideimide resin was not dissolved.

Resin Aqueous Solution 32

An attempt was made to prepare a resin aqueous solution by mixing 10.00 g of the polyamide resin F obtained in Synthesis Example 14 and 2.45 g (0.06 mol) of sodium hydroxide, adding 49.81 g of water to the mixture, heating the mixture to 50° C., and stirring the mixture, but the polyamide resin was not dissolved.

Resin Aqueous Solution 36

100.00 g of water was added to 10.00 g of carboxymethyl cellulose, and the mixture was stirred at 23° C. to obtain a resin aqueous solution 36.

TABLE 2

| Resin aqueous solution | Polymer Type | Addition amount | Basic compound Type | Equivalent based on the amount of acidic groups in polymer | Addition amount | Addition amount of water | Polymer concentration | Solid content concentration* | Solubility in water |
|---|---|---|---|---|---|---|---|---|---|
| 1 | Polyimide resin A | 10.00 g | NaOH | 1.0 mole equivalent | 0.94 g | 100.00 g | 9% | 10% | Good |
| 2 | Polyimide resin A | 10.00 g | NaOH | 0.8 mole equivalent | 0.69 g | 300.00 g | 3% | 3% | Good |
| 3 | Polyimide resin A | 10.00 g | NaOH | 1.5 mole equivalent | 1.41 g | 500.00 g | 2% | 2% | Good |
| 4 | Polyimide resin A | 10.00 g | NaOH | 4.0 mole equivalent | 3.76 g | 50.00 g | 16% | 22% | Good |
| 5 | Polyimide resin A | 10.00 g | $Na_2CO_3$ | 1.0 mole equivalent | 1.24 g | 100.00 g | 9% | 10% | Good |
| 6 | Polyimide resin A | 10.00 g | $Na_2HPO_4$ | 1.0 mole equivalent | 1.67 g | 100.00 g | 9% | 10% | Good |
| 7 | Polyimide resin A | 10.00 g | None | — | — | 100.00 g | 9% | 9% | Poor |
| 8 | Polyimide resin B | 10.00 g | NaOH | No acidic group | 0.94 g | 100.00 g | 9% | 10% | Poor |
| 9 | Polyimide resin C | 10.00 g | DMAE | 1.0 mole equivalent | 2.66 g | 1000.00 g | 1% | 1% | Good |
| 10 | Polyimide resin C | 10.00 g | DMAE | 2.0 mole equivalent | 5.30 g | 300.00 g | 3% | 5% | Good |
| 11 | Polyimide resin C | 10.00 g | DMAB | 1.0 mole equivalent | 2.65 g | 2000.00 g | 0% | 1% | Good |
| 12 | Polyimide resin C | 10.00 g | DMAE | 0.1 mole equivalent | 0.27 g | 1000.00 g | 1% | 1% | Good |
| 13 | Polyimide resin C | 10.00 g | None | — | — | 1000.00 g | 1% | 1% | Poor |
| 14 | Polyimide resin A | 10.00 g | $Ca(OH)_2$ | 1.0 mole equivalent | 0.87 g | 1000.00 g | 1% | 1% | Poor |
| 15 | Polyimide resin D | 10.00 g | DMAB | 1.0 mole equivalent | 0.91 g | 200.00 g | 5% | 5% | Good |
| 16 | Polyimide resin D | 10.00 g | None | — | — | 200.00 g | 5% | 5% | Poor |
| 17 | Polyimide resin E | 10.00 g | DMAB | 1.0 mole equivalent | 0.63 g | 200.00 g | 5% | 5% | Good |
| 18 | Polyimide resin F | 10.00 g | KOH | 1.0 mole equivalent | 1.69 g | 500.00 g | 2% | 2% | Good |
| 19 | Polyimide resin F | 10.00 g | KOH | 0.2 mole equivalent | 0.30 g | 500.00 g | 2% | 2% | Poor |
| 20 | Polyamideimide resin A | 10.00 g | NaOH | 1.0 mole equivalent | 0.61 g | 100.00 g | 9% | 10% | Good |
| 21 | Polyamideimide resin A | 10.00 g | TMAH | 1.0 mole equivalent | 1.38 g | 100.00 g | 9% | 10% | Good |
| 22 | Polyamideimide resin B | 10.00 g | NaOH | No acidic group | 0.32 g | 100.00 g | 9% | 9% | Poor |
| 23 | Polyamide resin A | 10.00 g | NaOH | 1.5 mole equivalent | 2.45 g | 49.81 g | 16% | 20% | Good |
| 24 | Polyamide resin A | 10.00 g | $Na_2CO_3$ | 3.0 mole equivalent | 13.00 g | 206.97 g | 4% | 10% | Good |
| 25 | Polyamide resin A | 10.00 g | $NEt_3$ | 0.5 mole equivalent | 2.07 g | 22.41 g | 29% | 35% | Good |
| 26 | Polyamide resin A | 10.00 g | NaOH | 20.0 mole equivalent | 32.70 g | 313.13 g | 3% | 12% | Good |
| 27 | Polyamide resin A | 10.00 g | NaOH | 3.0 mole equivalent | 4.90 g | 9.94 g | 40% | 60% | Good |
| 28 | Polyamide resin B | 10.00 g | $Na_2CO_3$ | 1.5 mole equivalent | 2.12 g | 68.67 g | 12% | 15% | Good |
| 29 | Polyamide resin C | 10.00 g | $NEt_3$ | 2.0 mole equivalent | 3.69 g | 41.08 g | 18% | 25% | Good |
| 30 | Polyamide resin D | 10.00 g | NaOH | 2.0 mole equivalent | 2.47 g | 49.88 g | 16% | 20% | Good |
| 31 | Polyamide resin E | 10.00 g | KOH | 2.5 mole equivalent | 2.27 g | 22.79 g | 29% | 35% | Good |
| 32 | Polyamide resin F | 10.00 g | NaOH | No acidic group | 2.45 g | 49.81 g | 16% | 20% | Poor |
| 33 | Polyimide resin G | 10.00 g | $Na_2CO_3$ | 0.3 mole equivalent | 3.18 g | 100.00 g | 9% | 12% | Good |
| 34 | Polyimide resin H | 10.00 g | $Na_2CO_3$ | 0.3 mole equivalent | 3.18 g | 10.00 g | 9% | 12% | Good |
| 35 | Polyimide resin J | 10.00 g | $Na_2CO_3$ | 0.3 mole equivalent | 3.18 g | 100.00 g | 9% | 12% | Good |

*The solid content concentration is the total content of the water-soluble polymer and the basic compound in the aqueous solution.

The evaluation methods in examples and comparative examples will now be described.

1. Observation of Surface of Coating Film

The appearance of the nonaqueous electrolyte battery separator obtained in each of examples and comparative examples was visually observed. A sample was rated good when there were no irregularities and no streaks, and a sample was rated poor when there were irregularities or streaks.

2. Evaluation of Air Permeation Increase

A Gurley densometer (type B) manufactured by Tester Sangyo Co., Ltd. was used. The porous film (I) used in each of examples and comparative examples and the separator obtained in each of examples and comparative examples were each fixed in such a manner that there were no creases between a clamping plate and an adapter plate, the air resistance was measured in accordance with JIS P-8117:2009, and the air permeation increase degree was calculated from the following equation.

Air permeation increase degree ($s$/100 cc Air)= {Air resistance of separator ($s$/100 cc Air)}−{air resistance of porous film (I) ($s$/100 cc Air)}

A sample having an air resistance of less than +100 s/100 cc Air was rated A, a sample having an air resistance of +100 s/100 cc Air or more and +200 s/100 cc Air or less was rated B, and a sample having an air resistance of more than +200 s/100 cc Air was rated C.

3. Evaluation of Shape Stability at the Time of Heating

The nonaqueous electrolyte battery separator obtained in each of examples and comparative examples was cut to a size of 50 mm×50 mm, and a marking with a length of 30 mm was then made in each of a side in a machine direction (MD) and a side in a traverse direction (TD) on the porous film (I) side. The separator with the markings was placed in an oven heated to each of temperatures of 150° C., 160° C. and 200° C. with the separator sandwiched between sheets of paper, and the separator was heated for 1 hour. Thereafter, the nonaqueous electrolyte battery separator was taken out from the oven, and cooled to room temperature, the length of the marking in each of MD and TD was then measured, and the thermal shrinkage ratio was calculated from the following equation where the length of the shorter marking portion is d (mm).

Heat shrinkage ratio (%)={(30−$d$)/30}×100

The thermal shrinkage ratio was measured at each of temperatures of 150° C., 160° C. and 200° C. A sample having a thermal shrinkage ratio of less than 3% was rated A, a sample having a thermal shrinkage ratio of 3% or more and 5% or less was rated B, and a sample having a thermal shrinkage ratio of more than 5% was rated C.

Example 1

Ceramic slurry was obtained by mixing alumina having an average particle diameter of 0.5 μm and the resin aqueous solution 1 in such a manner that the amount of the polyimide resin A was 2.0 parts by mass based on 100 parts by mass of alumina. Further, the concentration was adjusted with water so that the content of alumina in the ceramic slurry was 50% by mass. This ceramic slurry was mixed using a high-speed shearing stirrer (DESPA manufactured by Asada Iron Works Co., Ltd.), and dispersed using a continuous medium dispersing machine (NANO GRAIN MILL manufactured by Asada Iron Works Co., Ltd.).

Next, 78 parts by mass of 2-ethylhexyl acrylate, 19.8 parts by mass of acrylonitrile, 2 parts by mass of methacrylic acid and 0.2 parts by mass of allyl methacrylate (AMA) were mixed to prepare a monomer mixture. In another vessel, 70 parts by mass of ion-exchange water, 0.2 parts by mass of sodium dodecylbenzenesulfonate, 0.3 parts by mass of ammonium persulfate, and 0.82 parts by mass of a sodium polyoxyethylene alkyl ether sulfate ("EMAL (registered trademark) D-3-D" manufactured by Kao Chemicals) and 0.59 parts by mass of polyoxyethylene lauryl ether ("EMULGEN (registered trademark)-120" manufactured by Kao Chemicals) as emulsifiers were mixed, the gas phase part was purged with nitrogen gas, and the temperature was elevated to 60° C. The monomer mixture was added to the vessel, and emulsion polymerization was performed to prepare an aqueous dispersion of an acrylic resin.

The aqueous dispersion of the acrylic resin was added to the ceramic slurry in such a manner that the amount of the acrylic resin was 2.0 parts by mass based on 100 parts by mass of alumina, and the mixture was mixed using a three-one motor with a propeller blade to obtain a coating liquid for a porous layer (II).

Next, a polyethylene porous film (thickness: 12 μm, air resistance: 150 s/100 cc Air, thermal shrinkage ratio at 150° C.:80%) was prepared as a porous film (I). The coating liquid for forming the porous layer (II) was applied to one surface of the porous film (I) using a gravure coating machine, and dried at 50° C. for 1 minute, whereby the porous layer (II) was formed on the porous film (I) to obtain a nonaqueous electrolyte battery separator. The thickness of the porous layer (II) in the obtained nonaqueous electrolyte battery separator was 4.0 μm.

Examples 2 to 26

Except that the resin aqueous solution was changed as in Tables 3 and 4, the same procedure as in Example 1 was carried out to obtain a coating liquid. A nonaqueous electrolyte battery separator was obtained by forming the porous layer (II) on the porous film (I) in the same manner as in Example 1 using the obtained coating liquid. The thickness of the porous layer (II) of the obtained nonaqueous electrolyte battery separator was 4.0 μm.

Example 27

Except that alumina and the resin aqueous solution 1 were mixed in such a manner that the amount of the polyimide resin A was 5.0 parts by mass based on 100 parts by mass of alumina, the same procedure as in Example 1 was carried out to obtain a coating liquid for forming the porous layer (II). A nonaqueous electrolyte battery separator was obtained by forming the porous layer (II) on the porous film (I) in the same manner as in Example 1 using the obtained coating liquid. The thickness of the porous layer (II) of the obtained nonaqueous electrolyte battery separator was 4.0 μm.

Example 28

Except that alumina and the resin aqueous solution 1 were mixed in such a manner that the amount of the polyimide resin A was 0.4 parts by mass based on 100 parts by mass of alumina, the same procedure as in Example 1 was carried out to obtain a coating liquid for forming the porous layer (II). A nonaqueous electrolyte battery separator was obtained by forming the porous layer (II) on the porous film (I) in the same manner as in Example 1 using the obtained coating liquid. The thickness of the porous layer (II) of the obtained nonaqueous electrolyte battery separator was 4.0 μm.

Example 29

Except that the addition of the acrylic resin was 5.0 parts by mass based on 100 parts by mass of alumina, the same procedure as in Example 1 was carried out to obtain a coating liquid for forming the porous layer (II). A nonaqueous electrolyte battery separator was obtained by forming the porous layer (II) on the porous film (I) in the same manner as in Example 1 using the obtained coating liquid.

The thickness of the porous layer (II) of the obtained nonaqueous electrolyte battery separator was 4.0 µm.

Example 30

Except that the addition of the acrylic resin was 0.5 parts by mass based on 100 parts by mass of alumina, the same procedure as in Example 1 was carried out to obtain a coating liquid for forming the porous layer (II). A nonaqueous electrolyte battery separator was obtained by forming the porous layer (II) on the porous film (I) in the same manner as in Example 1 using the obtained coating liquid. The thickness of the porous layer (II) of the obtained nonaqueous electrolyte battery separator was 4.0 µm.

Example 31

Except that alumina and the resin aqueous solution 1 were mixed in such a manner that the amount of the polyimide resin A was 5.5 parts by mass based on 100 parts by mass of alumina, the same procedure as in Example 1 was carried out to obtain a coating liquid for forming the porous layer (II). A nonaqueous electrolyte battery separator was obtained by forming the porous layer (II) on the porous film (I) in the same manner as in Example 1 using the obtained coating liquid. The thickness of the porous layer (II) of the obtained nonaqueous electrolyte battery separator was 4.0 µm.

Example 32

Except that alumina and the resin aqueous solution 1 were mixed in such a manner that the amount of the polyimide resin A was 0.3 parts by mass based on 100 parts by mass of alumina, the same procedure as in Example 1 was carried out to obtain a coating liquid for forming the porous layer (II). A nonaqueous electrolyte battery separator was obtained by forming the porous layer (II) on the porous film (I) in the same manner as in Example 1 using the obtained coating liquid. The thickness of the porous layer (II) of the obtained nonaqueous electrolyte battery separator was 4.0 µm.

Example 33

Except that the addition of the acrylic resin was 5.5 parts by mass based on 100 parts by mass of alumina, the same procedure as in Example 1 was carried out to obtain a coating liquid for forming the porous layer (II). A nonaqueous electrolyte battery separator was obtained by forming the porous layer (II) on the porous film (I) in the same manner as in Example 1 using the obtained coating liquid. The thickness of the porous layer (II) of the obtained nonaqueous electrolyte battery separator was 4.0 µm.

Example 34

Except that the addition of the acrylic resin was 0.4 parts by mass based on 100 parts by mass of alumina, the same procedure as in Example 1 was carried out to obtain a coating liquid for forming the porous layer (II). A nonaqueous electrolyte battery separator was obtained by forming the porous layer (II) on the porous film (I) in the same manner as in Example 1, using the obtained coating liquid. The thickness of the porous layer (II) of the obtained nonaqueous electrolyte battery separator was 4.0 µm.

Examples 35 to 37

Except that the resin aqueous solution was changed as in Table 4, the same procedure as in Example 1 was carried out to obtain a coating liquid for forming the porous layer (II). A nonaqueous electrolyte battery separator was obtained by forming the porous layer (II) on the porous film (I) in the same manner as in Example 1 using the obtained coating liquid. The thickness of the porous layer (II) of the obtained nonaqueous electrolyte battery separator was 4.0 µm.

Comparative Examples 1 to 6 and 9

Except that the resin aqueous solution was changed as in Table 4, the same procedure as in Example 1 was carried out to obtain a coating liquid for forming the porous layer (II). A nonaqueous electrolyte battery separator was obtained by forming the porous layer (II) on the porous film (I) in the same manner as in Example 1 using the obtained coating liquid. The thickness of the porous layer (II) of the obtained nonaqueous electrolyte battery separator was 4.0 µm.

Comparative Example 7

Except that a resin aqueous solution was not added, the same procedure as in Example 1 was carried out to obtain a coating liquid for forming the porous layer (II). A nonaqueous electrolyte battery separator was obtained by forming the porous layer (II) on the porous film (I) in the same manner as in Example 1 using the obtained coating liquid. The thickness of the porous layer (II) of the obtained nonaqueous electrolyte battery separator was 4.0 µm.

Comparative Example 8

Except that an acrylic resin was not added, the same procedure as in Example 1 was carried out to obtain a coating liquid for forming the porous layer (II). A nonaqueous electrolyte battery separator was obtained by forming the porous layer (II) on the porous film (I) in the same manner as in Example 1 using the obtained coating liquid. The thickness of the porous layer (II) of the obtained nonaqueous electrolyte battery separator was 4.0 µm.

Compositions in Examples 1 to 37 and Comparative Examples 1 to 9 are shown in Tables 3 and 4, and evaluation results are shown in Tables 5 and 6.

TABLE 3

| | | Polymer | | Content* | |
|---|---|---|---|---|---|
| | Inorganic filler | Resin aqueous solution | Water-insoluble polymer | Water-soluble polymer | Water-insoluble polymer |
| Example 1 | alumina | Resin aqueous solution 1 | Acrylic resin | 2.0 | 2.0 |
| Example 2 | alumina | Resin aqueous solution 2 | Acrylic resin | 2.0 | 2.0 |
| Example 3 | alumina | Resin aqueous solution 3 | Acrylic resin | 2.0 | 2.0 |
| Example 4 | alumina | Resin aqueous solution 4 | Acrylic resin | 2.0 | 2.0 |
| Example 5 | alumina | Resin aqueous solution 5 | Acrylic resin | 2.0 | 2.0 |

TABLE 3-continued

| | Inorganic filler | Polymer Resin aqueous solution | Polymer Water-insoluble polymer | Content* Water-soluble polymer | Content* Water-insoluble polymer |
|---|---|---|---|---|---|
| Example 6 | alumina | Resin aqueous solution 6 | Acrylic resin | 2.0 | 2.0 |
| Example 7 | alumina | Resin aqueous solution 9 | Acrylic resin | 2.0 | 2.0 |
| Example 8 | alumina | Resin aqueous solution 10 | Acrylic resin | 2.0 | 2.0 |
| Example 9 | alumina | Resin aqueous solution 11 | Acrylic resin | 2.0 | 2.0 |
| Example 10 | alumina | Resin aqueous solution 12 | Acrylic resin | 2.0 | 2.0 |
| Example 11 | alumina | Resin aqueous solution 14 | Acrylic resin | 2.0 | 2.0 |
| Example 12 | alumina | Resin aqueous solution 15 | Acrylic resin | 2.0 | 2.0 |
| Example 13 | alumina | Resin aqueous solution 17 | Acrylic resin | 2.0 | 2.0 |
| Example 14 | alumina | Resin aqueous solution 18 | Acrylic resin | 2.0 | 2.0 |
| Example 15 | alumina | Resin aqueous solution 19 | Acrylic resin | 2.0 | 2.0 |
| Example 16 | alumina | Resin aqueous solution 20 | Acrylic resin | 2.0 | 2.0 |
| Example 17 | alumina | Resin aqueous solution 21 | Acrylic resin | 2.0 | 2.0 |
| Example 18 | alumina | Resin aqueous solution 23 | Acrylic resin | 2.0 | 2.0 |
| Example 19 | alumina | Resin aqueous solution 24 | Acrylic resin | 2.0 | 2.0 |
| Example 20 | alumina | Resin aqueous solution 25 | Acrylic resin | 2.0 | 2.0 |
| Example 21 | alumina | Resin aqueous solution 26 | Acrylic resin | 2.0 | 2.0 |
| Example 22 | alumina | Resin aqueous solution 27 | Acrylic resin | 2.0 | 2.0 |
| Example 23 | alumina | Resin aqueous solution 28 | Acrylic resin | 2.0 | 2.0 |

TABLE 4

| | Inorganic filler | Polymer Resin aqueous solution | Polymer Water-insoluble polymer | Content* Water-soluble polymer | Content* Water-insoluble polymer |
|---|---|---|---|---|---|
| Example 24 | alumina | Resin aqueous solution 29 | Acrylic resin | 2.0 | 2.0 |
| Example 25 | alumina | Resin aqueous solution 30 | Acrylic resin | 2.0 | 2.0 |
| Example 26 | alumina | Resin aqueous solution 31 | Acrylic resin | 2.0 | 2.0 |
| Example 27 | alumina | Resin aqueous solution 1 | Acrylic resin | 5.0 | 2.0 |
| Example 28 | alumina | Resin aqueous solution 1 | Acrylic resin | 0.4 | 2.0 |
| Example 29 | alumina | Resin aqueous solution 1 | Acrylic resin | 2.0 | 5.0 |
| Example 30 | alumina | Resin aqueous solution 1 | Acrylic resin | 2.0 | 0.5 |
| Example 31 | alumina | Resin aqueous solution 1 | Acrylic resin | 5.5 | 2.0 |
| Example 32 | alumina | Resin aqueous solution 1 | Acrylic resin | 0.3 | 2.0 |
| Example 33 | alumina | Resin aqueous solution 1 | Acrylic resin | 2.0 | 5.5 |
| Example 34 | alumina | Resin aqueous solution 1 | Acrylic resin | 2.0 | 0.4 |
| Example 35 | alumina | Resin aqueous solution 33 | Acrylic resin | 2.0 | 2.0 |
| Example 36 | alumina | Resin aqueous solution 34 | Acrylic resin | 2.0 | 2.0 |
| Example 37 | alumina | Resin aqueous solution 35 | Acrylic resin | 2.0 | 2.0 |
| Comparative Example 1 | alumina | Resin aqueous solution 7 | Acrylic resin | 2.0 | 2.0 |
| Comparative Example 2 | alumina | Resin aqueous solution 8 | Acrylic resin | 2.0 | 2.0 |
| Comparative Example 3 | alumina | Resin aqueous solution 13 | Acrylic resin | 2.0 | 2.0 |
| Comparative Example 4 | alumina | Resin aqueous solution 16 | Acrylic resin | 2.0 | 2.0 |
| Comparative Example 5 | alumina | Resin aqueous solution 22 | Acrylic resin | 2.0 | 2.0 |
| Comparative Example 6 | alumina | Resin aqueous solution 32 | Acrylic resin | 2.0 | 2.0 |
| Comparative Example 7 | alumina | — | Acrylic resin | 0.0 | 2.0 |
| Comparative Example 8 | alumina | Resin aqueous solution 1 | — | 2.0 | 0.0 |
| Comparative Example 9 | alumina | Resin aqueous solution 36 | Acrylic resin | 2.0 | 2.0 |

*The content of the polymer is expressed in terms of parts by mass based on 100 parts by mass of the inorganic filler.

TABLE 5

| | Surface of coating film | Air permeation increase degree s/100 ccAir | | Shape stability at the time of heating | | | | | |
|---|---|---|---|---|---|---|---|---|---|
| | | | | 150° C. Thermal shrinkage ratio/% | | 160° C. Thermal shrinkage ratio/% | | 200° C. Thermal shrinkage ratio/% | |
| Example 1 | Good | 50 | A | 0 | A | 1 | A | 2 | A |
| Example 2 | Good | 45 | A | 0 | A | 1 | A | 2 | A |
| Example 3 | Good | 55 | A | 0 | A | 1 | A | 2 | A |
| Example 4 | Good | 60 | A | 0 | A | 3 | B | 4 | B |
| Example 5 | Good | 55 | A | 0 | A | 1 | A | 2 | A |
| Example 6 | Good | 55 | A | 0 | A | 1 | A | 2 | A |
| Example 7 | Good | 50 | A | 0 | A | 1 | A | 2 | A |
| Example 8 | Good | 60 | A | 0 | A | 1 | A | 2 | A |
| Example 9 | Good | 50 | A | 0 | A | 1 | A | 2 | A |
| Example 10 | Good | 45 | A | 0 | A | 4 | B | 5 | B |
| Example 11 | Good | 50 | A | 0 | A | 4 | B | 5 | B |
| Example 12 | Good | 50 | A | 0 | A | 1 | A | 2 | A |
| Example 13 | Good | 50 | A | 0 | A | 3 | B | 4 | B |
| Example 14 | Good | 50 | A | 0 | A | 1 | A | 2 | A |
| Example 15 | Good | 35 | A | 2 | A | 4 | B | 5 | B |
| Example 16 | Good | 55 | A | 0 | A | 1 | A | 2 | A |
| Example 17 | Good | 45 | A | 0 | A | 1 | A | 2 | A |
| Example 18 | Good | 60 | A | 0 | A | 1 | A | 2 | A |
| Example 19 | Good | 65 | A | 0 | A | 1 | A | 2 | A |
| Example 20 | Good | 55 | A | 0 | A | 1 | A | 2 | A |
| Example 21 | Good | 50 | A | 0 | A | 4 | B | 5 | B |
| Example 22 | Good | 55 | A | 0 | A | 1 | A | 2 | A |
| Example 23 | Good | 45 | A | 0 | A | 1 | A | 2 | A |

TABLE 6

| | Surface of coating film | Air permeation increase degree s/100 ccAir | | Shape stability at the time of heating | | | | | |
|---|---|---|---|---|---|---|---|---|---|
| | | | | 150° C. Thermal shrinkage ratio/% | | 160° C. Thermal shrinkage ratio/% | | 200° C. Thermal shrinkage ratio/% | |
| Example 24 | Good | 60 | A | 0 | A | 1 | A | 2 | A |
| Example 25 | Good | 55 | A | 0 | A | 1 | A | 2 | A |
| Example 26 | Good | 50 | A | 0 | A | 1 | A | 2 | A |
| Example 27 | Good | 80 | A | 0 | A | 1 | A | 2 | A |
| Example 28 | Good | 40 | A | 0 | A | 1 | A | 2 | A |
| Example 29 | Good | 90 | A | 0 | A | 1 | A | 2 | A |
| Example 30 | Good | 20 | A | 0 | A | 1 | A | 2 | A |
| Example 31 | Good | 110 | B | 0 | A | 1 | A | 2 | A |
| Example 32 | Good | 40 | A | 1 | A | 4 | B | 5 | B |
| Example 33 | Good | 150 | B | 1 | A | 1 | A | 2 | A |
| Example 34 | Good | 20 | A | 2 | A | 4 | B | 5 | B |
| Example 35 | Good | 35 | A | 2 | A | 3 | B | 5 | B |
| Example 36 | Good | 35 | A | 2 | A | 3 | B | 5 | B |
| Example 37 | Good | 35 | A | 2 | A | 3 | B | 5 | B |
| Comparative Example 1 | Poor | 35 | A | 2 | A | 30 | C | 50 | C |
| Comparative Example 2 | Poor | 30 | A | 2 | A | 30 | C | 50 | C |
| Comparative Example 3 | Poor | 30 | A | 2 | A | 30 | C | 50 | C |
| Comparative Example 4 | Poor | 30 | A | 2 | A | 30 | C | 50 | C |
| Comparative Example 5 | Poor | 30 | A | 2 | A | 30 | C | 50 | C |
| Comparative Example 6 | Poor | 30 | A | 2 | A | 30 | C | 50 | C |
| Comparative Example 7 | Poor | 35 | A | 50 | C | 50 | C | 50 | C |
| Comparative Example 8 | Poor | 20 | A | 50 | C | 50 | C | 50 | C |
| Comparative Example 9 | Good | 20 | A | 2 | A | 30 | C | 50 | C |

Examples 1 to 37, which are nonaqueous electrolyte battery separators of the present invention, showed excellent evaluation results, whereas Comparative Examples 1 to 9, which are nonaqueous electrolyte battery separators that are out of the scope of the present invention, showed poor evaluation results.

The invention claimed is:

1. A nonaqueous electrolyte battery separator comprising:
a porous film (I) containing a polyolefin resin; and
a porous layer (II) containing an inorganic filler, a water-soluble polymer having a structure represented by general formula (1), a water-insoluble polymer selected from the group consisting of styrene resins, styrene-butadiene rubber, acrylic resins, polyalkylene oxides and fluororesins, and
a basic compound, wherein the basic compound is at least one compound selected from the group consisting of an alkali metal compound, a quaternary ammonium compound having 1 to 20 carbon atoms, and an aliphatic tertiary amine having 1 to 20 carbon atoms:

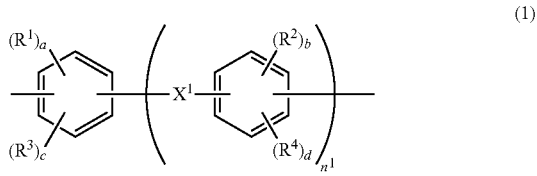

(1)

wherein:
$R^1$ and $R^2$ each independently represent a hydroxyl group, a carboxyl group or a sulfonic acid group;
$R^3$ and $R^4$ each independently represent a halogen, a nitro group or a monovalent organic group having 1 to 10 carbon atoms;
a and b each independently represent an integer of 1 or more;
c and d each independently represent an integer of 0 or more, provided that a+c and b+d each independently represent an integer of 1 to 4;
$n^1$ represents an integer of 0 to 3; and
$X^1$ represents a single bond, $CH_2$, $SO_2$, CO, O, S, $C(CH_3)_2$ or $C(CF_3)_2$;
wherein the basic compound is present in an amount of 0.2 to 4 mole equivalents based on acidic groups in the water-soluble polymer, and
wherein the nonaqueous electrolyte battery separator has a thermal shrinkage ratio of 5% or less when heated at 160° C. for 1 hour and 5% or less when heated at 200° C. for 1 hour.

2. The nonaqueous electrolyte battery separator according to claim 1, wherein the water-soluble polymer contains a polymer selected from the group consisting of polyimides, polyamides and polyamideimides.

3. The nonaqueous electrolyte battery separator according to claim 1, wherein the water-soluble polymer contains a structural unit selected from the group consisting of a structural unit represented by general formula (2) and a structural unit represented by general formula (3):

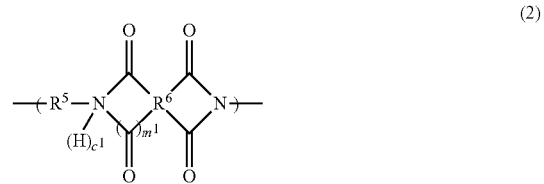

(2)

wherein:
$R^5$ represents a divalent organic group having 2 to 50 carbon atoms;
$R^6$ represents a trivalent or tetravalent organic group having 2 to 50 carbon atoms; and
$m^1$ and $c^1$ each represent 0 or 1, where $c^1$ is 1 when $m^1$ is 0, and $c^1$ is 0 when $m^1$ is 1; and

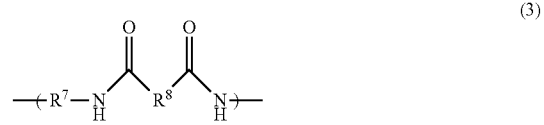

(3)

wherein $R^7$ and $R^8$ each independently represent a divalent organic group having 2 to 50 carbon atoms.

4. The nonaqueous electrolyte battery separator according to claim 3, wherein $R^6$ in the general formula (2) and/or $R^8$ in the general formula (3) has an aliphatic skeleton.

5. The nonaqueous electrolyte battery separator according to claim 1, wherein 50 mol % or more of $R^5$ and $R^7$ contained in the water-soluble polymer have a structure represented by the general formula (1).

6. The nonaqueous electrolyte battery separator according to claim 1, wherein the water-soluble polymer has a weight average molecular weight of 20,000 or more, wherein the weight average molecular weight is measured by gel permeation chromatography and determined in terms of polystyrene.

7. The nonaqueous electrolyte battery separator according to claim 1, wherein the porous layer (II) contains the water-soluble polymer in an amount of 0.4 to 5.0 parts by mass based on 100 parts by mass of the inorganic filler.

8. The nonaqueous electrolyte battery separator according to claim 1, wherein the porous layer (II) contains the water-insoluble polymer in an amount of 0.5 to 5.0 parts by mass based on 100 parts by mass of the inorganic filler.

9. A nonaqueous electrolyte battery in which a positive electrode and a negative electrode are laminated with a separator interposed therebetween, the separator being the nonaqueous electrolyte battery separator according to claim 1.

* * * * *